United States Patent [19]

Henzler

[11] Patent Number: 5,367,881
[45] Date of Patent: Nov. 29, 1994

[54] CRYOGENIC CONTROL OF EMISSION OF SOLVENT VAPORS FROM MIXERS

[75] Inventor: Gregory W. Henzler, Northville, Mich.

[73] Assignee: Liquid Carbonic Corporation, Oak Brook, Ill.

[21] Appl. No.: 127,872

[22] Filed: Sep. 28, 1993

[51] Int. Cl.[5] .................................................. F17C 5/02
[52] U.S. Cl. ...................................... 62/11; 62/47.1; 34/78; 366/144
[58] Field of Search .................. 62/9, 11, 47.1; 34/73, 34/78, 469, 470; 134/12, 31, 104.2, 109; 366/144, 75

[56] References Cited

U.S. PATENT DOCUMENTS

| | | | |
|---|---|---|---|
| 1,490,782 | 4/1924 | Milligan | 62/47.1 |
| 1,545,352 | 7/1925 | Rodriguez | 62/47.1 |
| 1,669,230 | 5/1928 | Cunningham | 62/47.1 |
| 3,781,132 | 12/1973 | Latinen | 366/144 X |
| 3,838,976 | 10/1974 | Bosch | 366/144 X |
| 3,948,490 | 4/1976 | Troope | 366/144 |
| 4,551,981 | 11/1985 | Banerjee | 62/47.1 X |
| 4,718,772 | 1/1988 | Delacour et al. | 366/144 X |
| 4,841,645 | 6/1989 | Bettcher et al. | 34/78 |
| 4,907,611 | 3/1990 | Shibano | 134/109 X |
| 5,011,542 | 4/1991 | Weil | 134/12 X |
| 5,125,167 | 6/1992 | Stearns | 34/78 X |
| 5,142,873 | 9/1992 | Ramsey, Jr. | 62/47.1 X |
| 5,232,281 | 8/1993 | Campbell | 366/144 |

FOREIGN PATENT DOCUMENTS 954926 6/1949 France .

Primary Examiner—Christopher Kilner
Attorney, Agent, or Firm—Fitch, Even, Tabin & Flannery

[57] ABSTRACT

A method is disclosed for the reduction of emissions of solvent vapors from a batch mixing vessel by cryogenically condensing such vapors in and adjacent the top loading hatch at a rate approximating their evaporation from the mix.

5 Claims, 1 Drawing Sheet

CRYOGENIC CONTROL OF EMISSION OF SOLVENT VAPORS FROM MIXERS

This invention relates to the protection of the environment in and about industrial plants for the manufacture of paints, caulks, adhesives, and the like, where the processing involves the mixing of solids with volative liquid solvents. More specifically, the invention relates to the prevention or reduction of the emission of organic solvent vapors from batch mixers, and the incidental recovery and return of the solvents in liquid form to the contents of the mixer as the mixing operation proceeds.

BACKGROUND OF THE INVENTION

In the manufacture of useful materials of the kind indicated, the solid ingredients are added to the liquid solvents in the mixer through a loading hatch in the top of the otherwise closed vessel. The loading of the solids is typically performed manually by the emptying of sacks of the solid materials into the mixer through the hatch while the beater-agitators are churning the mix, the solid materials typically being gum rubbers, soluble resins, clays, pigments, or the like.

The loading process may occur over a period of time which can exceed one hour, during which period the hatch remains open while the attendant dumps sackload after sackload of material into the churning mixer. During this period, and throughout the mixing process, which may extend to several hours per batch, the mechanical energy applied to the contents creates shearing forces within the mix, raising the temperature of the mix to the point where solvents, normally liquid at room temperature, are evaporated off in surprisingly large quantity, raising the pressure in the head space above the contents and escaping as vapor from the mixing vessel in various ways.

All such vessels are, of course, vented, many through a conservation vent, i.e., a pressure relief valve, which, in better installations, is connected to a stack which discharges the vapor to the atmosphere outside the plant building. Leakage of vapor through imperfect seals around the hatch cover is also not uncommon, as evident from the presence of liquid solvent on the outside of the mixing vessel adjacent the hatch, as well as from the heavy odor of the solvent vapors which permeate the plant atmosphere.

As the escape of solvent vapors during manual loading is not only inevitable but concentrated, the attendant is usually provided with special breathing equipment to avoid prolonged exposure to hazardous solvent vapors, but the amount of solvent discharged to the plant atmosphere in vapor form through the open hatch is substantial and typically compensated by increasing the volume of air movement through the plant interior. As commercially viable solvents are usually also combustible, the danger of fire, not to say explosion, is constant, notwithstanding provisions for preventing static electrical discharges, e.g., grounding the attendant handling the solids loading, and increasing the ambient humidity.

The recovery as liquid of vapor in the head space of closed storage vessels for volatile liquids by the use of heat-exchanger condensers is known from U.S. Pat. Nos. 1,490,782 and 1,545,352, but these prior art devices and systems do not contemplate the prevention of the escape of solvent vapors through the open loading hatch of a mixing vessel.

SUMMARY OF THE INVENTION

The invention addresses itself to this problem by reducing the vapor pressure buildup in such vessels by cryogenic treatment of the solvent vapors in the head space of the mixer, using a heat exchanger, fed from a source of cryogenic liquid, which lines the loading hatch and condenses the solvent vapors at a rate which markedly reduces and substantially prevents their escape through the open hatch during loading, and prevents their escape through the hatch cover seals when closed.

DESCRIPTION OF THE DRAWINGS

The invention is described in detail in conjunction with the accompanying drawings, of which

DESCRIPTION OF PREFERRED EMBODIMENT

Figure 2:
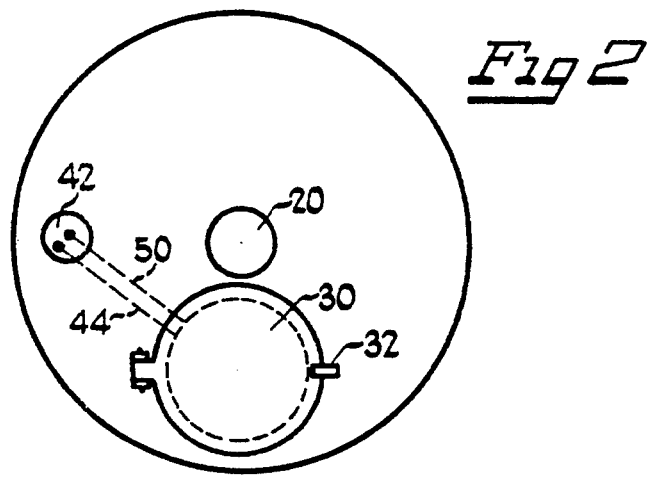
FIG. 2 is a diagrammatic plan view of the vessel, barren of much of the overlying piping which would otherwise obscure the supply lines to and from the heat exchanger in the loading hatch.

In the drawings, the apparatus for utilizing the invention is shown diagrammatically as applied to a batch mixing vessel 10 of cylindrical shape, having a hemispherical bottom 12 and a flat top 14. Such a mixer is typically supported from a plant floor by legs which elevate it sufficiently to provide under-clearance for a drain 18 through which the treated contents of the vessel are pumped to a remote location, for example, a storage vessel.

In the center of the top of the mixing vessel stands a vertical motor 20 coupled to an elongated drive shaft 22 extending downwardly into the mixer axially thereof to an agitator 24 which is immersed in the contents of the vessel well below the normal static liquid level thereof.

The contents of the mixer typically comprise an initial body of liquid solvent to which solids are added to make the batch. The solvent is supplied through a charging line 26 entering the vessel at or near its top for convenient additions when needed to adjust viscosity.

The solids are added to the liquid solvent through a loading hatch 28 in the top of the vessel, radially offset from the agitator drive motor 20, as seen in FIG. 2. The hatch is an upstanding tubular structure open to the interior of the mixing vessel 10, and has a hinged cover 30, typically with a seal and some form of clamp or dog 32 to secure it in the closed position.

Figure 1:
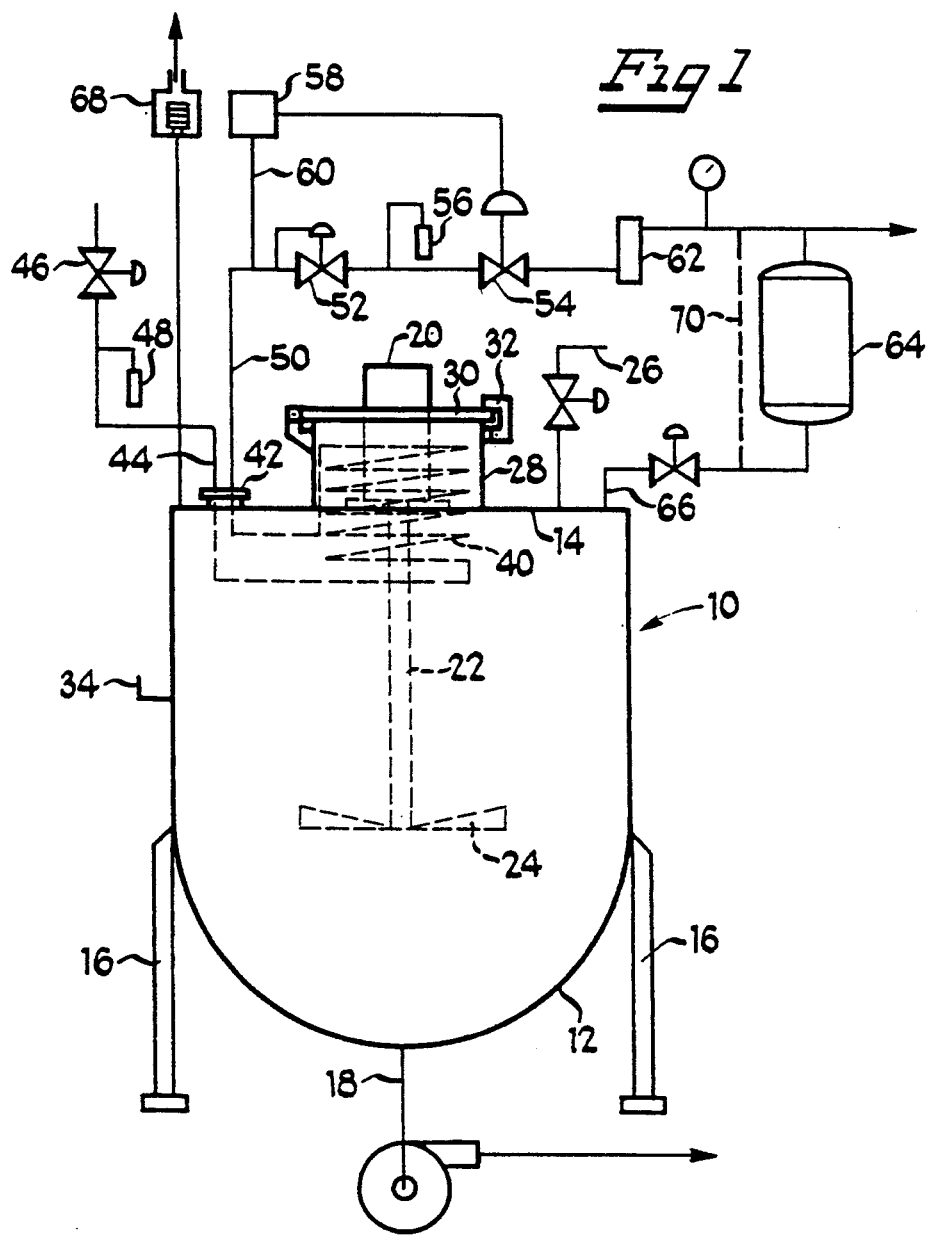
FIG. 1 is a diagrammatic elevational view of a mixing vessel fitted out for the practice of the invention.

In installations not provided with automatic solids loading, the solids are brought to the top of the mixer in sacks which are emptied into the mixing vessel by an attendant standing atop the vessel. Loading time will, of course, vary with the nature of the mix, but manual loading can take periods in excess of one hour in a mixing vessel of the type illustrated, which might have an overall height of some ten feet, with its other dimensions in the proportions seen in FIG. 1 of the drawing, and a batch capacity of two thousand gallons.

Temperature of the contents of the vessel 10 is monitored by a thermocouple 34 in the wall of the vessel.

Batch mixing vessels may take a number of forms other than that illustrated, but generally share in common the aspect of top loading of solids through a hatch provided for the purpose.

In accordance with the invention, the loading hatch 28 is lined with a heat exchanger 40 which may take the form of a coiled copper tube, either plain or finned, which is suspended by suitable brackets (not shown) secured to the inside wall of the hatch 28. The ends of the coil are carried across the underside of the top wall of the vessel to emerge from the top of the vessel through the cover plate 42 of an access port.

The line 44 from the lower end of the heat exchanger 40 is connected to a supply of liquid cryogen through a shut-off valve 46, and is desirably provided with a pressure relief valve 48. The supply source may take the form of a permanent, refillable plant supply tank or one or more dewars of the liquid cryogen, with suitable manifolding and valving to accommodate the use and replacement of individual dewars seriatim.

For reasons believed obvious, the cryogen used is preferably inert to chemical combination with solvents under ordinary conditions of pressure and temperature. Liquid nitrogen is preferred for its relatively lower boiling point, but liquid carbon dioxide may also be used where liquid nitrogen is not readily available in quantity.

The line 50 from the upper end of the heat exchanger passes through a normally-open low temperature shut-off valve 52 and then through a gas-temperature responsive control valve 54 which regulates the flow of gas from the heat exchanger 40, which functions as an evaporator coil for the liquid cryogen. A pressure relief valve 56 upstream of the flow control valve 54 provides protection in the event of malfunction of the control valve 54.

Temperature control of the flow-control valve 54 in the outgoing gas line 50 is preferably effected by a programmable controller 58 which senses gas line temperature with a thermocouple 60, and can be set to serve the cooling requirements of the mixing cycle, which are variable in any given cycle, and may vary from material to material.

Leaving the flow-control valve 54, the spent gas passes through a flow meter 62, and thence to a gas reservoir, which may be the house gas line, in a sizable installation of multiple mixing vessels or other inert-gas consuming apparatus, or a simple reservoir tank 64, as shown, in which the gas can be stored for future use.

In a batch mixing vessel employing combustible solvents, inert gas is commonly used to purge the vessel of air before the solvent is introduced, and to maintain either a slight positive pressure or a minimal oxygen level while the loading hatch is open for loading in the solids. The inert gas is introduced into the top of the mixing vessel through a charging line 66 connected either to such reservoir, in a single mixer operation, or to the house gas line in an installation having other uses for the inert gas.

In the simplest case of single mixer installation, the spent gas, after flowing from the heat exchanger 40, and through the flow control valve 54, may be returned directly to the head space of the mixing vessel 10, for purging, eliminating the need for the reservoir 64, as indicated by the broken-line shunt 70, bypassing the reservoir 64, the maximum gas pressure in the head space being maintained slightly positive, typically four ounces gauge, by a conservation vent 68 leading preferably to the atmosphere outside the plant.

A not untypical mixing cycle may consume several hours during which the temperature of the mix will inevitably rise from the mere input of mechanical energy into the mix, as well as from exothermic phenomena, if any, associated with the intimate intermixing of particular ingredients. Where the solvents employed are liquid even well above room temperature, the agitation of the contents nevertheless liberates solvent vapor in large quantity from the surface of the mix.

In mixing vessels not equipped for the practice of the invention, the vaporized solvent, under increasing vapor pressure, escapes from the vessel to atmosphere through the vent stack 68 and any other available discharge opening, including the hatch opening where the seals are not in good condition, or if in good condition, are fouled by solids residue from the loading operation. These solvent losses, discharged to the atmosphere inside and outside the plant, are not only hazardous to the ecology generally and to the humans who may chance to breathe it for prolonged periods, they must also be replaced for the sake of maintaining the desired viscosity of the mix.

Similarly, when the loading hatch is opened for the loading in of further solids after the initial mixing, and after higher temperatures are reached, the churning of the mix brings fresh solvent continually to the surface for evaporation, resulting in a heavy flow of solvent vapor out of the open hatch. While the loading attendant can be protected to a degree by special breathing apparatus, and by electrically grounding him where combustibles are involved, the hazards are never fully neutralized.

With the use of the method of the invention, however, the intense cold of the protective heat exchanger 40 constitutes an effective barrier to the escape of most of the solvent vapor through the open hatch. This is evident from the cloud in the head space above the churning mix beneath the heat exchanger coil, as viewed through the open hatch 28, indicating the droplet condensation of the saturated solvent vapor. Moreover, when the hatch 28 is opened after a period of operation following loading, typically all solids residue left on the heat exchanger 40 after loading is gone, and the heat exchanger coils are flushed clean and bright by the recondensed solvent vapor, which is returned by gravity to the mix.

In an actual test of the method of the invention in connection with the mixing of an adhesive compound in a 2000 gallon mixer, using hexane as the liquid solvent vehicle, the mixing of a single batch over a period of approximately six and one-half hours was accompanied by a loss of solvent found to be so small that the product viscosity was within product specifications without the addition of any further solvent. This was in contrast with add-backs of significant amounts of solvent in prior batches without the invention.

In this test, some 120 gallons of liquid nitrogen were evaporated through a copper heat exchange coil of some sixty-one feet of ⅜ inch plain copper tube mounted inside the loading hatch of the mixer, at pressures within the coil which ranged from 20 psig down to 13 psig, while product temperatures climbed from 68° F. to 153° F. and temperature in the head space of the mixer ranged from 46° F. to 61° F. during loading, i.e., with the hatch open, and up to 146° F. after some four hours of mixing with the hatch cover closed. As earlier stated, no hexane was required to be added to the initial charge during the approximately six and one-half hour cycle because the viscosity of the sample taken at the end of the mixing cycle was within product specifications. The elimination of solvent additions to replace evaporation losses shortens batch time as well by eliminating the need for cut-and-try viscosity testing.

Elimination of the need for supplying additional make-up solvent to replace the large quantities otherwise irretrievably vaporized provides economic justification for the installation and use of the invention. That is to say, in an operational mixing plant, the value of the solvent recovered by use of the invention well exceeds the cost of the liquid cryogen consumed, and amortizes much of the capital cost of installation over the useful life of the equipment needed to practice the invention. The protection of the environment is thus achieved at relatively little cost.

The features of he invention believed new and patentable are set forth in the following claims.

I claim:

1. The method of reducing the escape of volatile solvent vapors from batch mixing vessels having top-loading hatches, comprising:

lining the loading hatch of the vessel with a heat exchanger connected to a source of liquid cryogen;

admitting the cryogen to said heat exchanger, during the mixing of solids with a volatile liquid solvent in said vessel, at a rate sufficient to condense vaporized solvent at a rate approximating its rate of evaporation from the mix within the vessel; and returning liquid solvent condensed upon said heat exchanger to the contents of the vessel.

2. The method of claim 1 wherein the cryogen vaporizes to an inert gas in said heat exchanger, and wherein the method includes the further step of employing the spent gas from said heat exchanger to provide an inert atmosphere above the contents of said vessel.

3. The method of claim 2 wherein the flow of cryogen to said heat exchanger is begun before the mixing of the charge within the vessel, and discharging the spent gas from said heat exchanger into the vessel for a time sufficient to purge air from the vessel.

4. The method of claim 1 wherein the cryogen vaporizes to an inert gas in said heat exchanger, and wherein the method includes the further steps of expanding the spent gas into a retention reservoir maintained above atmospheric pressure, and using the retained gas to purge the head space of the vessel over a subsequent batch.

5. The method of any one of claims 1 to 4 inclusive, wherein the liquid cryogen employed is liquid nitrogen.

* * * * *